W. L. HALL.
FLYTRAP.
APPLICATION FILED AUG. 26, 1919.
1,381,824.
Patented June 14, 1921.
2 SHEETS—SHEET 2.
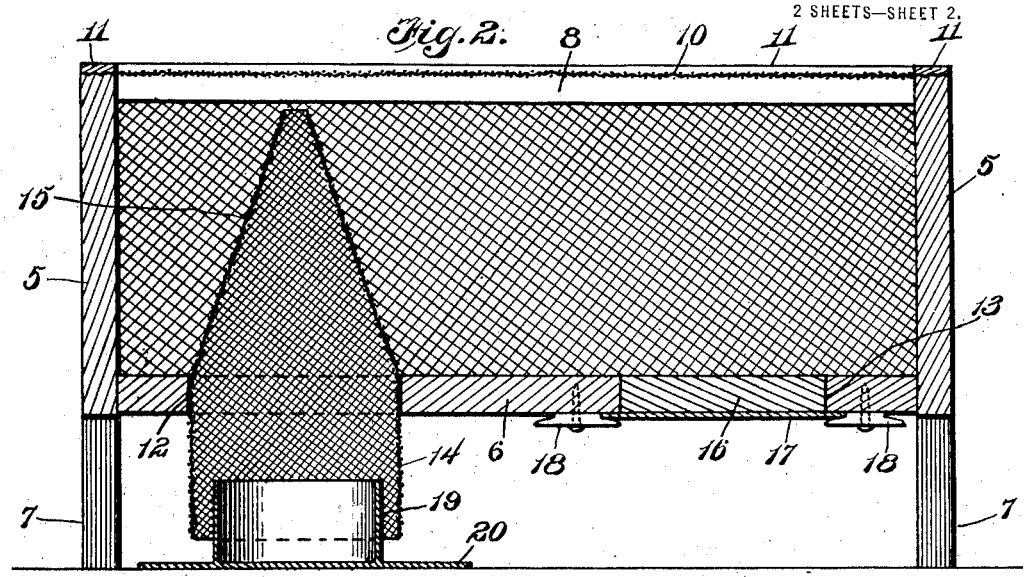
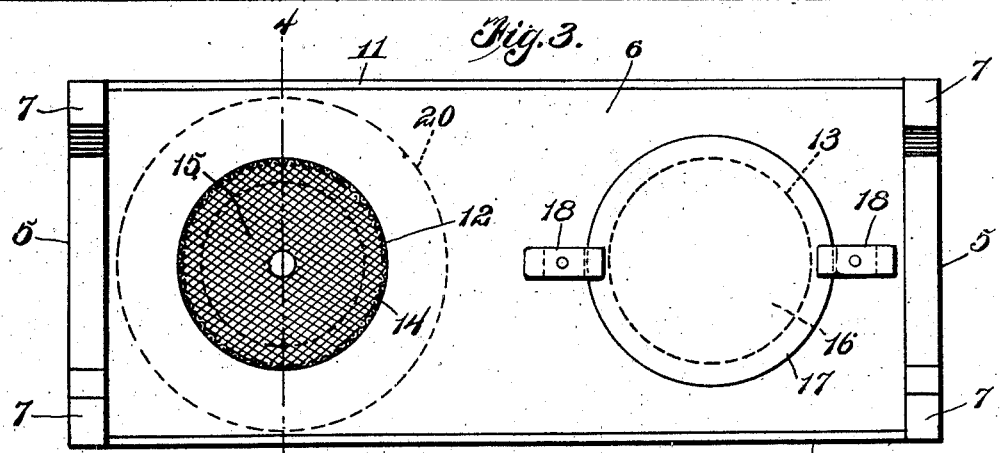
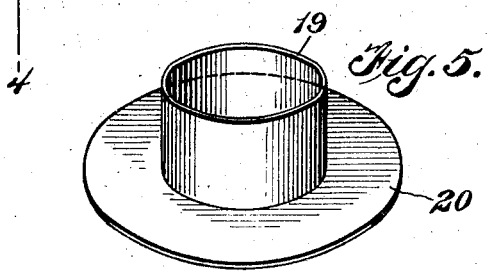
WITNESS:
J. R. Heinrichs
INVENTOR.
BY W. L. Hall
Victor J. Evans
ATTORNEY.

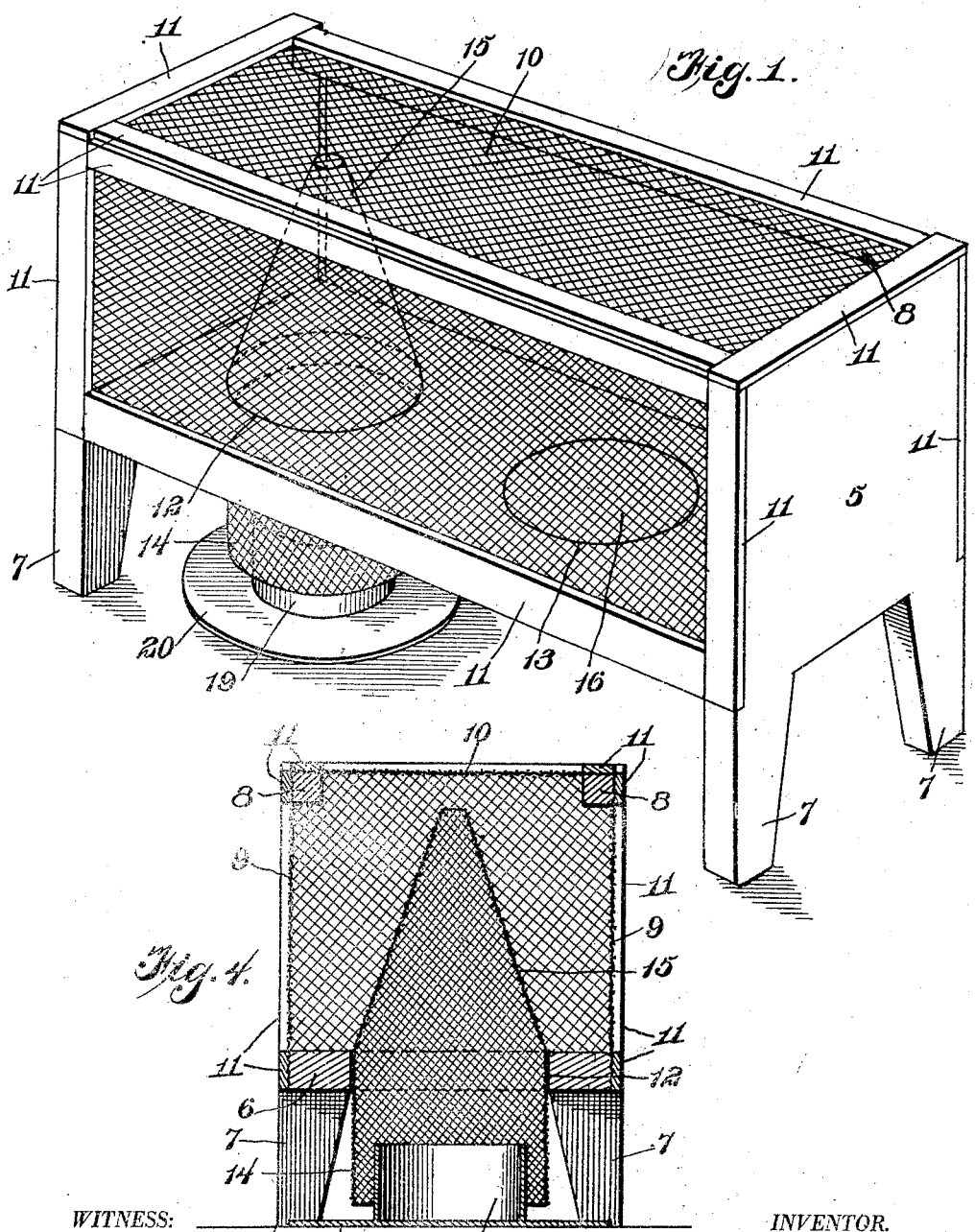

UNITED STATES PATENT OFFICE.

WILLARD LESLIE HALL, OF HOWARD, KANSAS.

FLYTRAP.

1,381,824.                    Specification of Letters Patent.    Patented June 14, 1921.

Application filed August 26, 1919. Serial No. 319,972.

*To all whom it may concern:*

Be it known that I, WILLARD L. HALL, a citizen of the United States, residing at Howard, in the county of Elk and State of Kansas, have invented new and useful Improvements in Flytraps, of which the following is a specification.

This invention relates to improvements in insect traps.

An object of the invention is to provide a fly trap comprising a body wholly or partially of reticulated material, the bottom thereof being elevated, and the said bottom having a downwardly extending reticulated cylinder, the upper portion thereof entering the trap and being of conical formation. The cylinder is arranged a suitable distance above the support for the trap and is designed to receive therein a cup-shaped bait pan which, however, is spaced out of contact therewith. The flies being attracted by the bait in the pan enter the same. In attempting an exit the flies will travel upward on the reticulated cylinder, entering the conical trap portion thereof, finding an exit through the reduced end of the said conical member which leads directly into the trap, so that the flies are thus effectively trapped. The device is provided with an outlet door at the bottom thereof, which is normally retained closed, but through the opening therefor the flies, after the extermination thereof through want of food, may be readily removed.

It is a further object of the invention to produce a fly trap that shall be of a simple construction, and when once set needs no further attention except the replenishment of the bait in the bait pan and the removal of the dead flies from the trap.

It is a further object of the invention to produce a device of this character which shall be of a simple construction, cheap to manufacture and market, and one which will perform the functions for which it is intended with certainty and with accuracy.

In the drawings:

Figure 1 is a perspective view of the improvement;

Fig. 2 is an approximately central vertical longitudinal sectional view through the same;

Fig. 3 is a bottom plan view;

Fig. 4 is a transverse sectional view approximately on the line 4—4 of Fig. 3; and Fig. 5 is a perspective view of the bait pan.

While the improvement may be constructed wholly of reticulated material, such as wire mesh, in the disclosure of the drawings the ends 5 thereof are constructed of wood, as is also the bottom 6. The ends project a suitable distance below the bottom, and at the corners thereof are provided with legs 7.

Connecting the ends 5, at the upper corners thereof are longitudinal strips 8, and secured to the edges of the bottom, the edges of the sides and bent or folded over the strips 8 is a wire mesh which comprises the sides 9 and top 10 of the cage. Suitable strips 11 may be connected to the edges of the ends 5, the bottom and to the strips 8 for concealing the edges of the mesh and for firmly holding the same upon the frame construction.

The bottom 6 is provided with two spaced preferably round openings 12 and 13 respectively. Secured in the opening 12 is a cylinder 14 of reticulated material, such as wire mesh, the latter projecting a suitable distance downward from the bottom 6. The upper portion of the cylinder is provided with a conical extension 15, the reduced end of which terminating a suitable distance away from the top 10 of the device and is open. This extension provides the trap for the flies, as the opening therein is only slight and the said opening being arranged, as stated, near the top of the device, but out of contact therewith prevents the reëntrance of the insects therethrough. In this connection attention should be directed to the well known fact of a disinclination of flies to travel in a downward direction.

The second opening 13 is designed to receive therein a plug 16 that has secured upon its under face a flat round disk 17 which extends a suitable distance beyond the peripheral edge of the plug, and the said disk, being thus in the nature of a flange, and this flange is designed to be engaged by pivoted members, in the nature of turn buttons 18 which are secured on the under face of the bottom.

The numeral 19 designates the bait pan, which, in the present instance has adjacent the bottom thereof an annular flange 20. The outer face of the flange is arranged flush with the bottom of the bait pan, and the said flange is designed to provide a support for the pan as well as a means whereby the insects may travel thereover and enter the pan. The pan is designed to be arranged in the end of the reticulated cylinder 14, being of a size to be freely received therein and arranged out of contact with all of the walls of the cylinder.

The flies enter the bait pan, being directed thereto by the surrounding portion of the cylinder 14. It is, of course, to be understood that the end of the cylinder is arranged a suitable distance above the flange 20 of the bait pan. The flies having eaten their fill desire to leave the device. The natural inclination of the fly is to travel upwardly. The light entering from the top of the trap entices the fly to travel in an upward direction. Consequently, he travels upward on the cylinder and the conical extension 15 thereof, passing through the reduced opening in the end of the conical member into the trap. As no food is permitted in the trap and as the flies can not again have access to the food in the pan they are exterminated by starvation. The dead flies may be removed by releasing the turn buttons and removing the plug or door 16 from the opening 13.

From the foregoing description, it will be seen that a simple and efficient device is produced by the employment of only a small number of parts.

Having thus described the invention, what is claimed as new, is:—

A fly trap of the class described comprising a cage of reticulated material and having its ends and bottom constructed of wood, legs provided at the corners thereof, longitudinal strips connecting said ends, said bottom having an opening and a reticulated cylinder secured in said opening and projecting above and below the bottom, a reticulated conical member connected with the cylinder and projecting into the cage and having its reduced end provided with an opening and disposed below the top of the cage.

In testimony whereof I affix my signature.

WILLARD LESLIE HALL.